United States Patent
Pique et al.

(10) Patent No.: US 7,997,853 B2
(45) Date of Patent: Aug. 16, 2011

(54) ROTARY PRESSURE TRANSFER DEVICE WITH IMPROVED FLOW

(75) Inventors: Gonzalo G. Pique, Oakland, CA (US); Richard L. Stover, Oakland, CA (US); Jeremy G. Martin, Oakland, CA (US); Juan Miguel Pinto, Oakland, CA (US)

(73) Assignee: Energy Recovery, Inc., San Leandro, CA (US)

( * ) Notice: Subject to any disclaimer, the term of this patent is extended or adjusted under 35 U.S.C. 154(b) by 0 days.

(21) Appl. No.: 12/754,013

(22) Filed: Apr. 5, 2010

(65) Prior Publication Data

US 2010/0196152 A1     Aug. 5, 2010

Related U.S. Application Data

(63) Continuation of application No. PCT/US2008/078961, filed on Oct. 6, 2008.

(60) Provisional application No. 60/977,789, filed on Oct. 5, 2007.

(51) Int. Cl.
*F01D 15/08* (2006.01)
*F04B 35/00* (2006.01)

(52) U.S. Cl. .............. 415/90; 415/92; 415/95; 415/116; 415/117

(58) Field of Classification Search .................... 415/90, 415/92, 95, 116, 117; 417/64, 92, 103, 375, 417/405

See application file for complete search history.

(56) References Cited

U.S. PATENT DOCUMENTS

| 5,687,763 | A | 11/1997 | Steinke |
| 5,878,649 | A | 3/1999 | Raab |
| 5,988,993 | A | 11/1999 | Hauge |
| 6,460,342 | B1 * | 10/2002 | Nalim ............................. 60/772 |
| 6,537,035 | B2 * | 3/2003 | Shumway ........................ 417/64 |
| 6,540,487 | B2 * | 4/2003 | Polizos et al. .................. 417/65 |
| 6,659,731 | B1 * | 12/2003 | Hauge ............................ 417/64 |
| 7,201,557 | B2 | 4/2007 | Stover |
| 7,306,437 | B2 | 12/2007 | Hauge |

FOREIGN PATENT DOCUMENTS

| KR | 10-2004-0046875 | 6/2004 |
| WO | WO 01/31242 | 5/2001 |
| WO | WO 2009/046429 A3 | 4/2009 |

OTHER PUBLICATIONS

WIPO, "Written Opinion of the International Searching Authority" dated Apr. 13, 2009 issued in corresponding International Application No. PCT/US2008/078961 (3 pages).

* cited by examiner

*Primary Examiner* — Igor Kershteyn
(74) *Attorney, Agent, or Firm* — Fitch Even Tabin & Flannery

(57) ABSTRACT

A rotary pressure transfer device utilizes a multi-channel, generally cylindrical rotor (15) that revolves with its flat end faces juxtaposed with flat end surfaces of a pair of flanking end covers (19, 21) in which inlet and outlet passageways are provided. The design is such that there are only oblique ramps (65) in the passageways on the high pressure side which create directional flow of liquid to cause rotor revolution in the desired direction. Passageways (27a, 27b) on the low pressure side may be shaped so that there is essentially axial or longitudinal flow entry and discharge of liquid between the channels and the passageways, or passageways (71) may be constructed to create directional flow that slightly retards rotor revolution in such desired direction.

20 Claims, 3 Drawing Sheets

ROTARY PRESSURE TRANSFER DEVICE WITH IMPROVED FLOW

CROSS REFERENCE TO RELATED APPLICATIONS

This application is a continuation of International Application No. PCT/US08/078961, filed Oct. 6, 2008, which claims priority from U.S. Provisional Application No. 60/977,789, filed Oct. 5, 2007, the disclosures of both of which are incorporated herein by reference.

FIELD OF THE INVENTION

This invention relates to rotary pressure transfer devices where a first fluid, under a high pressure, hydraulically communicates with a second, lower pressure fluid to transfer pressure between the fluids and produce a high pressure discharge stream of the second fluid. More particularly, the invention relates to such rotary, pressure transfer devices wherein end cover designs are improved to decrease mixing of the fluids in the device and better control overall operation.

SUMMARY OF THE INVENTION

Present day rotary pressure transfer devices employ a rotor having a plurality of channels that are often reasonably widely spaced apart and a pair of opposite end covers which each have at least one inlet passageway and at least one discharge passageway. Accordingly, as the rotor makes one complete revolution, each channel will receive inflow at least twice, i.e., at least once with high pressure liquid entering from one end and at least once with low pressure liquid entering from the opposite end. Each channel will simultaneously discharge at least twice as these longitudinal channels in the rotor revolve or rotate past respective aligned pairs of inlet and discharge passageways in the opposite end covers.

In these rotary devices, such as those disclosed in U.S. Pat. Nos. 6,540,487 and 7,201,557, end covers are often used that direct both high- and low-pressure incoming liquid obliquely at the rotor channels to create impact force in the channels that induces rotation. Liquid is partially diverted by such oblique ramps in the end covers from a longitudinal flow direction to a flow direction which has a substantial velocity component that will impact against the radial walls of the channels in the rotor. The oblique ramp angles in the high- and low-pressure streams are typically substantially equal, such that the flow of each stream contributes approximately equally to the total force that is driving rotor rotation. As a result, inflows of both high- and low-pressure liquids move the interface between the two liquids in a rotor channel substantially the same axial distance in each direction along the length of the rotor at each filling of a channel of the rotor so long as there are available high- and low-pressure flows.

In some instances, it is particularly important to minimize the amount of mixing that occurs between the two liquids; however, there is a reluctance to reduce the efficiency of the pressure transfer device to achieve such an end. In some pressure transfer devices of this general type, e.g. those that are shown in U.S. Pat. Nos. 3,431,747, 6,537,035, and 6,773,226, the use of channels of circular cross-section is advocated where pistons or separators are disposed in each of the channels in order to physically avoid mixing (see balls 34 in the '226 patent). However, such solutions to the problem of mixing are felt to not only reduce efficiency by occupying a part of the volume of each channel, but also complicate the device by requiring complex controls to prevent pistons from slamming into one of the ends of the channel. Such could occur if the high- and low-pressure flows were to become unequal, a condition which might result from natural flow variations in the process or, more often, during startup or shut down operations.

As a result, other solutions to minimize mixing of liquids in rotary pressure transfer devices of this type and to guard against substantial fluctuations in rates of feed flow have been sought.

It has now been found that if oblique ramps that each create directional inlet flow to cause the rotation of the rotor are included only in the inlet and discharge passageways on the high-pressure side and the low-pressure liquid is allowed to flow into and out of the channels in an essentially longitudinal direction, not only can a pressurized second liquid stream be delivered that shows minimal evidence of mixing, but other significant operational advantages follow along with such minimization of mixing.

In one particular aspect, the invention provides a pressure transfer device for transferring pressure energy from a high pressure first fluid to a lower pressure second fluid to provide a pressurized second fluid, which device includes:

a cylindrical rotor mounted to revolve about its axis and having a pair of opposite planar end faces with at least two channels extending axially therethrough between apertures located in said planar end faces; and a pair of opposite end covers having axially inward and outward end surfaces, with said inward end surfaces interfacing with and slidingly and sealingly engaging said respective opposite end faces of said rotor, each said end cover having one or more inlet passageways and one or more discharge passageways which open into said axially inward surfaces, said opposite end covers being aligned so that when one rotor channel is aligned with an inlet passageway opening in one said end cover, it is also aligned with a discharge passageway opening in said other end cover, said inlet passageway and discharge passageway openings in the same end cover being constantly sealed from each other during operation by a sealing region at the interface between said rotor end face and said end cover surface, whereby, as a result of revolution of said rotor, each said rotor channel is, in alternating sequence, brought into partial or full alignment with a high pressure inlet passageway opening in one said end cover and a high pressure discharge passageway opening in the other said end cover and then into partial or full alignment with a low pressure discharge passageway opening in said one end cover and a low pressure inlet passageway opening in said other end cover, so that each said channel is alternately supplied with the high pressure first fluid through said one end cover and then with the second fluid through said other end cover, the improvement which comprises oblique ramps in said high pressure inlet and discharge passageways in said end covers which cause directional flow of high pressure fluid into and out of said rotor channels to provide force that causes said rotor to revolve in a first angular direction, while said low pressure inlet and discharge passageways are devoid of any such ramps that would so direct flow to provide additive impetus to cause said rotor to revolve in the first angular direction.

In another particular aspect, the invention provides a pressure transfer device for transferring pressure energy from a high pressure first fluid to a lower pressure second fluid to provide a pressurized second fluid, which device includes:

a cylindrical rotor mounted to revolve about its axis and having a pair of opposite planar end faces with at least two channels extending axially therethrough between apertures located in said planar end faces; and a pair of opposite end covers having axially inward and outward end surfaces, with said inward end surfaces interfacing with and slidingly and sealingly engaging said respective opposite end faces of said rotor, each said end cover having one or more inlet passageways and one or more discharge passageways which open into said axially inward surfaces, said opposite end covers being angularly aligned so that when one said channel in said rotor is aligned with an inlet passageway opening in one said end cover, it is also aligned with a discharge passageway opening in said other end cover, each said inlet passageway opening and each said discharge passageway opening in said same end cover being constantly sealed from each other during operation by a sealing region at the interface between said rotor end face and said end cover surface, whereby, as a result of revolution of said rotor, each said rotor channel is, in alternating sequence, brought into partial or full alignment with a high pressure inlet passageway opening in one said end cover and a high pressure discharge passageway opening in the said other end cover and then into partial or full alignment with a low pressure discharge passageway opening in said one end cover and a low pressure inlet passageway opening in said end cover, so that each said channel is alternately supplied with the high pressure first fluid through said one end cover and then with the second fluid through said other end cover, the improvement which comprises oblique ramps in said high pressure inlet and discharge passageways in said end covers which cause directional flow of high pressure fluid into and out of said rotor channels to provide force that causes said rotor to revolve in a first angular direction, and reverse oblique ramps in said low-pressure inlet and discharge passageways which cause directional flow of low-pressure fluid into and out of said rotor channels in a manner which tends to retard the revolution of the rotor in the first angular direction.

DETAILED DESCRIPTION OF PREFERRED EMBODIMENTS

It has now been found that it is practical to employ end covers with oblique ramps only on the high-pressure side. As a result, the entry of high-pressure liquid drives rotor motion while the entry of low-pressure liquid has no effect on rotor motion. One result of such an arrangement is an increase in the flow rate of low-pressure liquid, which can be adjusted to substantially flush the rotor in each fill, e.g. by significantly displacing brine and replacing it with relatively low-salinity seawater when employed in a desalination operation, without changing the rotor speed. Generally, in a reverse osmosis desalination system, the flow rate of the high pressure brine being delivered to the pressure transfer device will be substantially constant, i.e., generally steady and without significant variation. However, the flow rate of the low pressure seawater inflow may occasionally spike upwards which might momentarily change rotor speed where both flows are being used to power the rotor revolution; such might result in excess rotor speed which in turn could cause destructive phenomena such as pressure shock and/or cavitation. In addition, seawater flow might also drop precipitously should there be problems with valving and/or high pressure pumps, and such could likewise provide undesirable shocks to the system. It has been found that such potential difficulties are mitigated when the speed of rotor revolution is made dependent only upon the steady high pressure brine inflow. Moreover, straight-line inflow of low pressure seawater results in minimization of mixing at the interface between the two liquids and is also advantageous in this respect, in addition to flushing as mentioned above.

Figure 1:
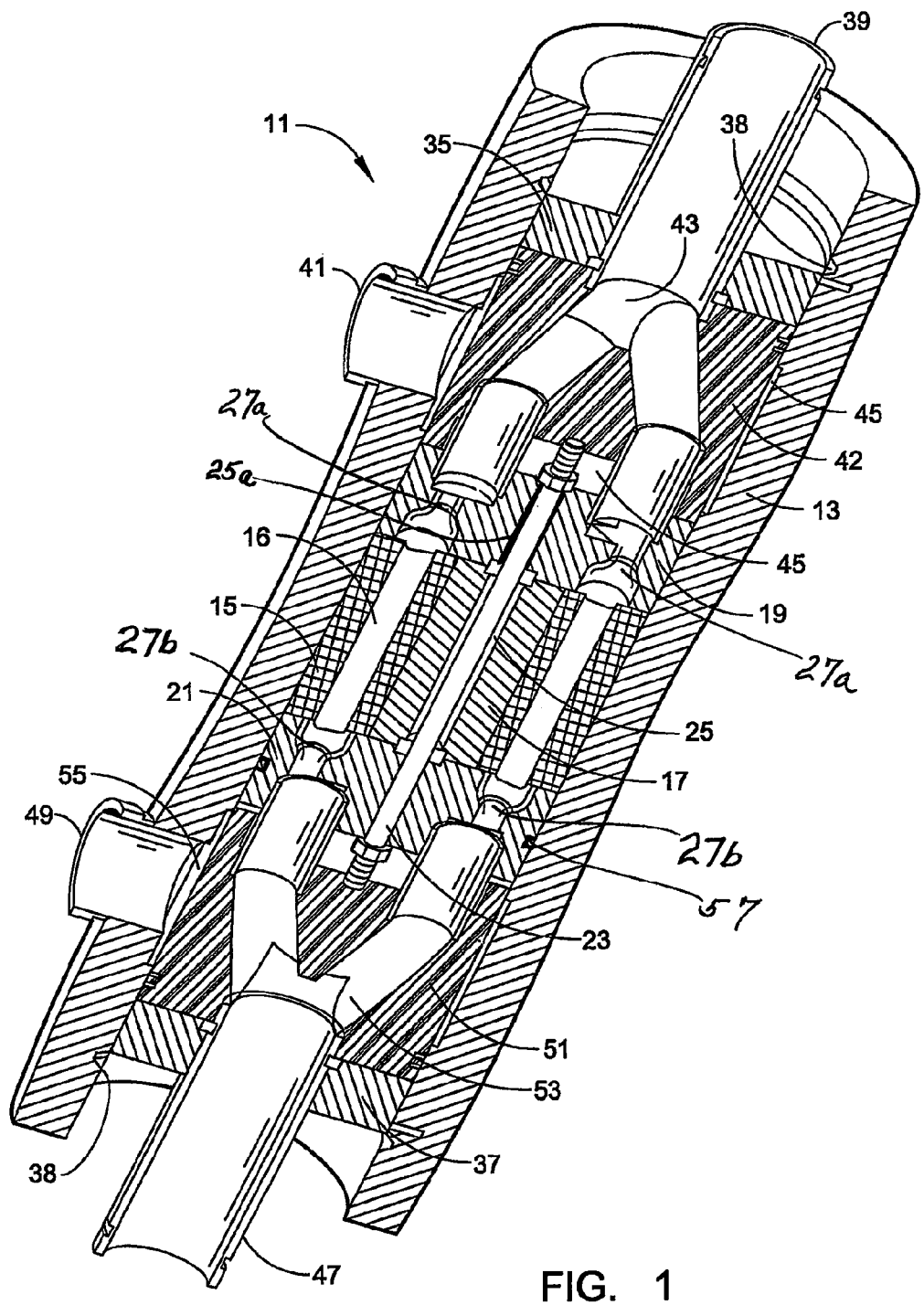
FIG. 1 is a perspective view, shown in cross-section, of a pressure transfer device of this general type which uses a rotor that rotates about a central stator.

Shown in FIG. 1 is a rotary pressure transfer device 11 that includes an elongated, generally cylindrical housing or body 13 in which there is disposed a cylindrical rotor 15 having a plurality of longitudinal channels 16 which extend end-to-end and open into the respective flat end faces 32 of the rotor. The channels 16 are sometimes referred to as composite channels as a thin web divides each pre-shaped channel into two parts to increase stability and structural strength of the rotor 15. The rotor 15 revolves about a central hollow stator 17; two end covers 19, 21 having a plurality of passageways 27, 29 (see FIG. 2) sandwich the rotor and stator therebetween. For convenience of explanation, the components are referred to as upper and lower end covers in accordance with the orientation of the device in the drawings. However, such is merely used for convenience as it should be understood that the device may be operated in any orientation, vertical, horizontal or otherwise.

To permit these internal components to be handled as a unit, they are often united as a subassembly through the use of a central tension rod 23 which is located in an enlarged chamber 24 disposed axially of the hollow stator and the rotor; the tension rod also passes through axial passageways 25a, 25b in the upper and lower end covers. This threaded tension rod 23 is then secured by washers and hex nuts or the like to create a subassembly of the four components wherein the two end covers 19, 21 are in abutting contact with the ends of the stator 17. Preferably, short dowel pins are seated in aligned holes 31 in the endcovers and the stator to assure the two end covers are maintained in precise alignment with each other via interconnection through the supporting hollow stator 17 (see FIG. 2). The tolerances are such that, when the rotor 15 is revolving so as to transfer pressure between aqueous solutions or the like in the channels 16, there is a very thin liquid seal created between the flat upper and lower end faces 32 of the rotor and the juxtaposed axially inward surfaces 33 of the upper and lower end covers 19, 21. The passageways 27 and 29 in the end covers terminate in openings 34 of different shapes in these flat end surfaces 33.

The cylindrical housing 13 is closed by upper and lower closure plates 35, 37. Snap rings (not shown) or other suitable locking ring arrangements are received in grooves 38 in the housing to secure the closure plates 35, 37 in closed position. A low pressure liquid (e.g. seawater) inlet conduit 39 passes axially through the upper closure plate 35. A side outlet 41 in the housing 13 is provided to discharge the seawater that has been increased in pressure within the device. A molded polymeric cylindrical body 42 provides a branched conduit 43 to interconnect the seawater inlet 39 to two low pressure (LP) inlet passageways 27a in the end cover 19, and it and the interior housing surface are shaped to also provide a plenum chamber 45 through which the high pressure (HP) outlet passageways 29b in the end cover communicate with the side discharge conduit 41. The opening 25a through the end cover 19 is enlarged in diameter to provide communication through the end cover to the high pressure seawater plenum chamber 45 for a purpose described hereinafter.

A similar construction exists at the lower end where a conduit 47 that passes axially through the lower closure plate 37 serves to discharge the low pressure brine stream; the high pressure brine enters through a side inlet 49 in the housing. A similar cylindrical molded polymeric interconnector 51 is located in the housing between the lower end cover 21 and the lower closure plate 37. The interconnector 51 is similarly formed to provide a branched conduit 53 through which the brine discharge conduit 47 is connected to the two LP outlet passageways 27b in the end cover 21, and its exterior is shaped to create a high pressure plenum chamber 55 that is in communication with the two brine HP inlet passageways 29a and the side high pressure brine inlet 49. The lower end cover 21 through which the brine enters and exits has a groove midway along its outer surface that accommodates an annular high pressure seal 57 (FIG. 1).

As an example of operation, low pressure seawater at about 30 psig may be supplied, as by pumping, into the straight conduit 39 at the upper end of the device, and high pressure brine from a reverse osmosis operation is supplied to the side inlet conduit 49 at, e.g., about 770 psig. As explained in more detail hereinafter, the passageways 29a and 29b through which high pressure liquid will flow in the end covers 19, 21 are constructed so that such entering and exiting liquid streams will cause the rotor 15 to revolve in a desired angular direction, as well known in this art. The high pressure brine fills the lower plenum chamber 55 and flows therethrough to the two HP inlet passageways 29a in the lower end cover 21. As the rotor revolves, high pressure liquid is supplied to the lower end of each channel 16 while it is in communication with the respective HP passageway opening 34; this simultaneously causes the same volume of liquid, e.g. seawater, to be discharged from the opposite end of the composite channel 16, which seawater has been raised to about the pressure of the incoming brine. Such discharge flow of the now pressurized second liquid (i.e. seawater) exits via an HP outlet passageway 29b in the upper end cover 19 and then follows a path through the upper plenum 45 to the side outlet 41. When this rotating composite channel 16 next becomes aligned with an opening 34 to a low pressure seawater inlet passageway 27a in the axially inward surface 33 of the upper end cover 19, the channel will be simultaneously aligned with an LP brine outlet passageway 27b in the lower end cover 21. Thus, as lower pressure seawater flows into the upper end of the channel 16, it causes discharge of the now depressurized brine from the lower end of the device 11 through the branched conduit 53 and straight brine outlet conduit 47.

Figure 2:
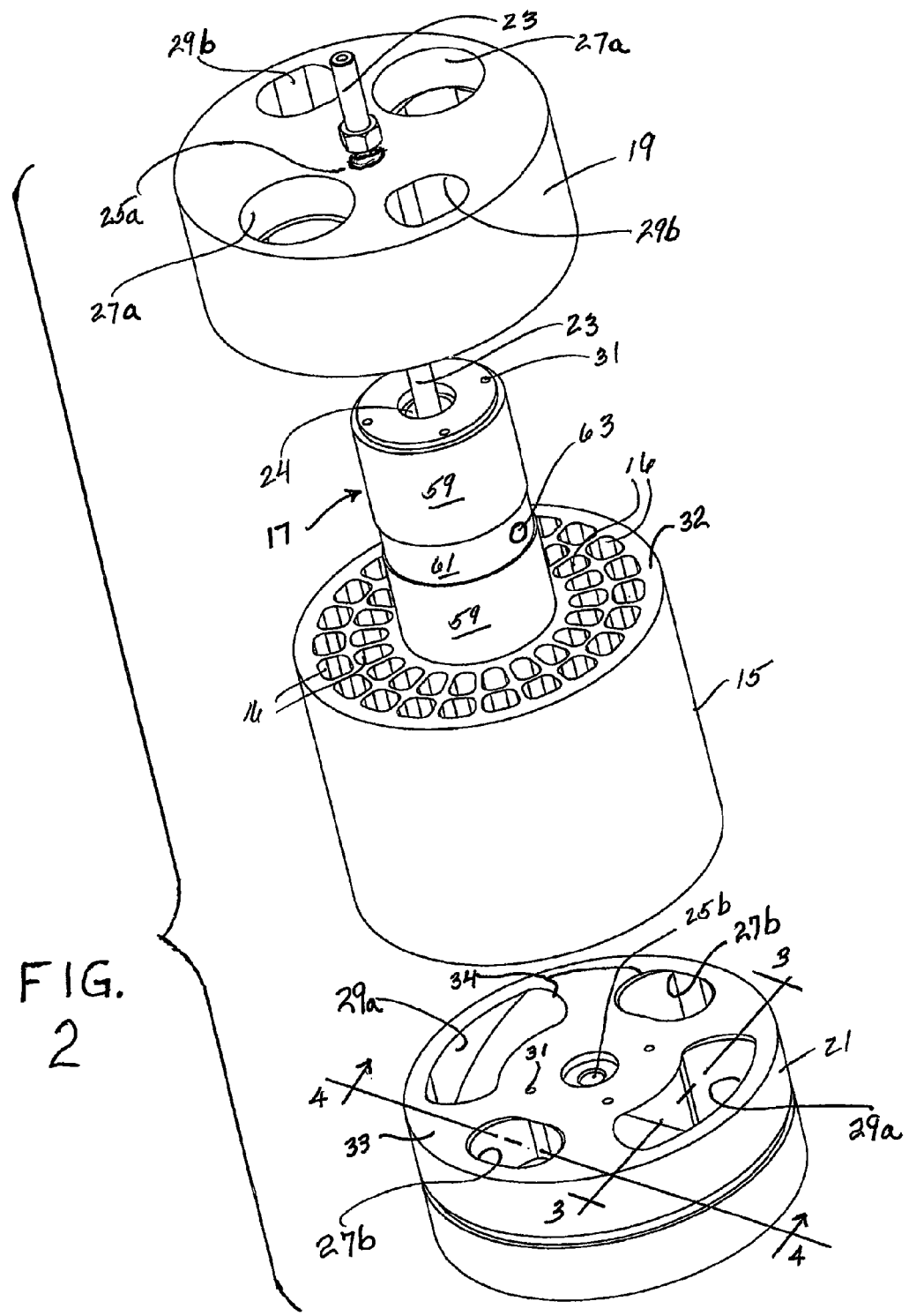
FIG. 2 is an exploded perspective view, enlarged in size, of a subassembly of two end covers, a rotor, a stator, and a tension rod as employed in the pressure transfer device of FIG. 1.
Figure 3:
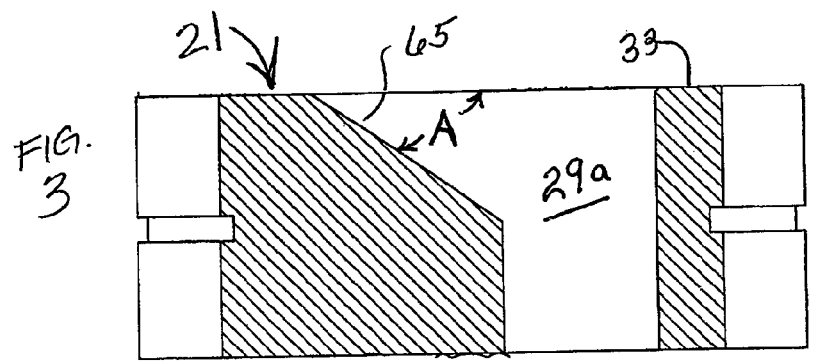
FIG. 3 is a cross-sectional view, enlarged in size, taken through one end cover generally along line 3-3 of FIG. 2.
Figure 4:
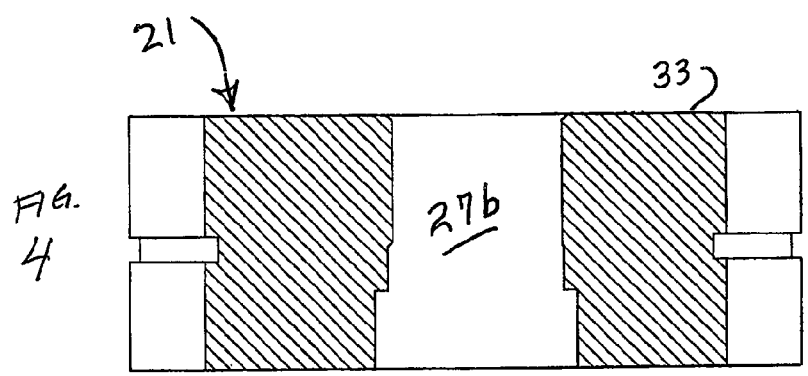
FIG. 4 is a cross-sectional view, enlarged in size, taken through the one end cover generally along line 4-4 of FIG. 2.

Referring more in detail to the components shown in FIGS. 2, 3 and 4, it can be seen that the rotor 15 is generally cylindrical in shape but has a large central opening wherein the stator 17 is received. A fairly large number of longitudinal composite channels 16 extend axially between its flat end surfaces 32, which channels are generally pie-shaped composites in cross-section and spaced uniformly from one another, with each being divided into 2 sections by an intermediate web. For example, there are 22 composite channels illustrated that are equiangularly spaced in an annular region about the central axis with each channel constituting an annular segment of about 13-14° of the 360°. The central stator 17 is preferably mated with both of the end covers 19, 21 by short dowel pins (not shown) which are received in the holes 31. This provides a stable rotational platform for the rotor, particularly when the central tension rod 23 is installed to unite these components as a subassembly with the rotor in place. The design is such that hydrodynamic bearing surfaces 59 are provided laterally on the stator 17, which two surfaces are spaced apart provide a central recess 61 that serves as a lubrication reservoir. A radial passageway 63 extends through the stator from this reservoir 61 to the enlarged axial chamber 24 and provides fluid communication therebetween. The axial chamber 24 is filled with high pressure seawater as a result of the enlarged passageway 25a through the upper end cover 19 which (see FIG. 1) is in communication with the upper plenum chamber 45 through which the increased pressure seawater is discharged from the device 11.

The two end covers 19, 21 are of generally similar construction. Each cover is formed with two generally diametrically opposed low pressure passageways 27 and two high pressure passageways 29. The two low pressure passageways in each end cover are respectively interconnected through the two branched passageways 43, 53 provided by the molded interconnectors 42, 51 which lead to the axially aligned conduits 39, 47. The LP passageways 27 (FIG. 4) are designed with smooth, generally straight walls that extend generally axially therethrough. Depending upon the end cover, they serve either as the LP inlet passageways 27a or as the LP discharge passageways 27b. As a result of their shaping, there is essentially straight longitudinal flow between each rotating channel 16 and the LP passageways 27a, 27b through the openings 34 in the flat axially inward end surfaces 33 of the end covers 19, 21.

In contrast to the interior shaping of the low pressure passageways, the high pressure passageways 29a, 29b are shaped with curved interior walls that lead to oblique ramps 65 (FIG. 3) that direct the high pressure liquid obliquely into and out of the composite channels 16 in the rotor. These respective pairs of HP passageways are respectively connected via the plenum chambers 45, 55 to the side conduits 41, 49. The plenum chambers are created by the shaping of the exterior surfaces of the molded polymeric interconnectors 42, 51 to create a central chamber which is joined with shallow recesses in the interior wall of the housing 13 at these regions between the end covers and the end closure plates to provide communication to each side conduit 41, 49 in the housing wall.

As a result, the high pressure brine, which enters through the side inlet 49 and fills the plenum chamber 55 and flows through the high pressure inlet passageways 29a in the lower end cover 21; its flow past the oblique ramp 65 causes it to enter the channels 16 with an oblique force vector that is directed against the wall of the pie-shaped composite channel. The now pressurized seawater exiting from the opposite upper end of each channel likewise impinges against the oblique ramps 65 in the HP outlet passageway 29b, resulting in directional exit flow from the channel on its way into the upper plenum chamber 45 and then out the side discharge conduit 41. This oblique impinging flow of the entering high pressure brine and the directional outflow of the pressurized seawater are employed to create the desired rotation speed, i.e., RPMs, of the rotor 15; such can be varied via the angle of inclination of the ramp 65 to the flat surfaces of the juxtaposed end surfaces 33 of the end cover end faces 32 of the rotor. As best seen in FIG. 3, this angle A should be between about 12° and about 65°, preferably between about 12° and about 30° and more preferably between about 18° and about 24°. In contrast to this, as can be seen from FIG. 4, the passageways 27 on the lower pressure side of the device are essentially smooth walled passageways that simply are shaped to supply a flow of liquid to or accept a discharge of liquid from the channels 16 in an essentially axial or longitudinal direction.

As a result of this construction, a pressure transfer device 11 can be designed so that the flow rate of low pressure seawater that is pumped to the device is greater than the flow rate of high pressure brine that is being fed to the device from a reverse osmosis operation or the like. The additional low pressure flow will not increase the rotor speed and will, therefore, have no effect on the filling and discharging processes occurring on the high pressure side of the rotor. As a consequence, whereas the same amount of elevated pressure seawater is discharged through the side outlet 41 as would be if oblique ramps were included in both the high pressure and low pressure passageways, the greater amount of flow of seawater into each channel will essentially purge the channels of brine at the point of brine discharge through the low pressure passageways 27b in the lower end cover 21. As a result, the interface between the two liquids is then moved longitudinally in the channel so that when the channel is next filled with high pressure brine, this interface will be longitudinally more distant from the discharge opening in the upper end cover 19. The consequence of the change is that there will be minimal entry of brine into the elevated seawater stream being discharged because of potential mixing between the two liquids that are in contact at the interface. This can be of significant importance to, for example, a seawater desalination operation, in which the salt content of the seawater stream being supplied to the system determines its osmotic pressure, and it is of course this osmotic pressure that determines the pressure at which the system must effectively be operated to achieve efficient desalination flow in such a cross-flow reverse osmosis filtration operation. The advantages of such minimizing of salt content are felt to substantially override the cost of pumping a slightly greater volume of low pressure seawater to the pressure transfer device 11.

Moreover, rotors, end covers and stators for these pressure transfer devices are prone to potential damage via cavitation or pressure shock, particularly in these devices which often run at relatively high speeds, i.e. 2,000 rpms or even higher. In a reverse osmosis desalination operation in which these pressure transfer devices are most frequently used, it has been found that, when significant interruptions or significant changes in liquid supply rates occur, they will usually occur on the side of the low pressure seawater supply; such is true because the outlet flow rate of high pressure brine from these often large seawater desalination plants remains extremely steady and constant. By using only the steady, high pressure flow to drive the rotor, significant variations or even interruptions in the flow of low pressure seawater do not result in potential cavitation or pressure shock of substantial magnitude because such flow is simply longitudinally into and out of the channels from the low pressure inlet passageways 27a. Likewise, potential oversupply of the seawater through some abnormality also would not result in potential cavitation or pressure shock that might be caused by excess speed, whereas cavitation or pressure shock might potentially result if the low pressure side liquid was also being used to drive the rotor.

Figure 5:
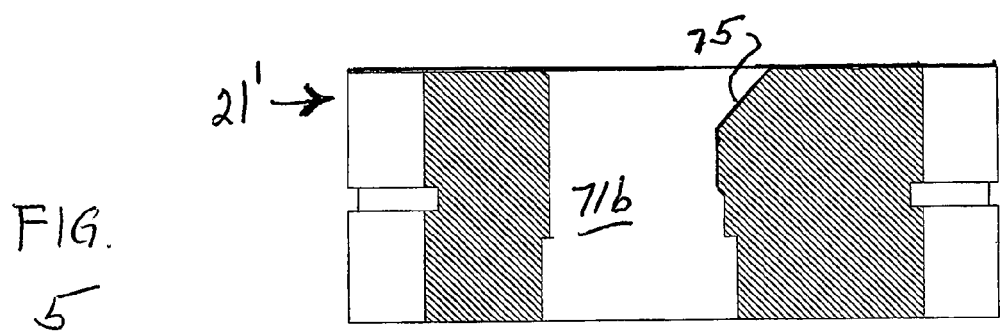
FIG. 5 is a cross-sectional view similar to FIG. 4 taken through an alternative embodiment of an end cover.

A potential alternative arrangement employs end covers (see end cover 21' illustrated in FIG. 5) having high-pressure passageways 29a and 29b of about the same construction as described which include ramps 65 so that directional entry of the high-pressure brine and discharge of the HP seawater drive the revolution of the rotor. However, the end cover 21' (as well as the upper end cover) is provided with LP passageways 71 which are constructed with short, oblique ramps 75 that are oriented in a direction opposite to the orientation of the ramps 65. FIG. 5 shows an LP discharge passageway 71b with such a reverse-oriented ramp 75. The consequence of having such a reverse orientation of the ramps 75 in the passageways on the low-pressure side is to counteract or retard, to some degree, the driving impetus of the high-pressure brine's directional entry into and exit from the channels 16. However, by aligning the ramps 65 in the high-pressure channels at an appropriate angle within the range of about 12° and 65° to the flat inner surfaces 33 of the end covers, and by aligning the reverse orientation ramps 75 in the low-pressure passageways at a higher angle, e.g. about 45° to about 80°, and/or making the ramps much shorter (as shown in FIG. 5), the rotor 15 would continue to revolve at its desired RPM. As can be seen by comparing FIGS. 3 and 5, the ramps 75 are preferably shorter in length than the ramps 65, and are more preferably not greater than about half the length of the ramps 65. This alternative arrangement continues to provide a greater scouring/flushing effect in the channels 16 being filled with the low-pressure seawater while also providing built-in protection against a possible low-pressure overflow event. Such would now simply cause a slight reduction in rotor speed from low pressure seawater flow rate fluctuation, as opposed to a potentially large increase in speed that could give rise to potentially destructive cavitation in such pressure transfer devices that employ both HP and LP streams to drive the rotor.

A further advantage of such an alternative arrangement would be the potential ability to free a blockage without disassembly of the entire pressure transfer device were such a blockage to occur. In such an instance, if a liquid were supplied only to the low-pressure inlet passageways, the result would be the revolution of the rotor in the opposite angular direction, e.g. counterclockwise instead of clockwise, and such could dislodge a potential obstruction and purge it from the device without disassembly.

In summary, the concept of using only the HP flow to drive a rotor in a commercial device of this type is believed to be novel and to afford the advantages noted over the prior art. The added novelty of employing reverse-oriented ramps in the LP passageways is believed to afford additional control advantages.

Although the invention has been described in terms of preferred embodiments which constitute the best mode known to the inventors for carrying out this inventive concept, it should be understood that various changes and modifications as would be obvious to one having ordinary skill in this art may be made without departing from the scope of the invention which is set forth in the claims appended hereto. For example, although the illustrated and described device 11 utilizes end covers each having two inlet passageways and two outlet passageways, it should be understood that, depending upon the overall capacity of the device, each end cover could be designed with only one each of such passageways or with three or more of each such passageways. Similarly, although the description is that of a rotor revolving about a central stator that provides bearing surfaces for the cylindrical interior surface of the hollow rotor, the more traditional design wherein the rotor revolves within a surrounding tubular sleeve might be alternatively used.

It should likewise be understood that the illustration of the rotor as having a plurality of generally pie-shaped channels with intermediate webs is by no means limiting, and a variety of different channel shapes could be used. For example, the pie-shaped channel webs could be eliminated if desired, or channels of a circular or other cross-section shape could be used as shown in U.S. Pat. No. 4,887,942.

Particular features of the invention are set forth in the claims which follow.

The invention claimed is:

1. In a pressure transfer device for transferring pressure energy from a high pressure first fluid to a lower pressure second fluid to provide a pressurized second fluid, which device includes:
a cylindrical rotor mounted to revolve about its axis and having a pair of opposite planar end faces with at least two channels extending axially therethrough between apertures located in said planar end faces; and
a pair of opposite end covers having axially inward and outward end surfaces, with said inward end surfaces interfacing with and slidingly and sealingly engaging said respective opposite end faces of said rotor,
each said end cover having one or more inlet passageways and one or more discharge passageways which open into said axially inward surfaces, said opposite end covers being aligned so that when one rotor channel is aligned with an inlet passageway opening in one said end cover, it is also aligned with a discharge passageway opening in said other end cover,
said inlet passageway and discharge passageway openings in the same end cover being constantly sealed from each other during operation by a sealing region at the interface between said rotor end face and said end cover inward surface,
whereby, as a result of revolution of said rotor, each said rotor channel is, in alternating sequence, brought into partial or full alignment with a high pressure inlet passageway opening in one said end cover and a high pressure discharge passageway opening in the other said end cover and then into partial or full alignment with a low pressure discharge passageway opening in said one end cover and a low pressure inlet passageway opening in said other end cover, so that each said channel is alternately supplied with the high pressure first fluid through said one end cover and then with the lower pressure second fluid through said other end cover,
the improvement which comprises oblique ramps in said high pressure inlet and discharge passageways in said end covers which cause directional flow of high pressure fluid into and out of said rotor channels to provide force that causes said rotor to revolve in a first angular direction, while said low pressure inlet and discharge passageways are devoid of any such ramps that would so direct flow to provide additive impetus to cause said rotor to revolve in the first angular direction.

2. The improvement according to claim 1, wherein said oblique ramps are oriented at an angle of between 12° and 65° to said rotor planar end faces.

3. The improvement according to claim 2, wherein said low pressure passageways are shaped so that the low pressure fluid flows substantially axially into and out of said rotor channels.

4. The improvement according to claim 1, wherein said oblique ramps are oriented at an angle of between 12° and 30° to said rotor planar end faces.

5. The improvement according to claim 4, wherein said low pressure passageways are shaped so that the low pressure fluid flows substantially axially into and out of said rotor channels.

6. The improvement according to claim 1, wherein said oblique ramps are oriented at an angle of between about 18° and about 24° to said rotor planar end faces.

7. The improvement according to claim 6, wherein said low pressure passageways are shaped so that the low pressure fluid flows substantially axially into and out of said rotor channels.

8. The improvement according to claim 6, wherein said low-pressure inlet and discharge passageways include reverse-oriented oblique ramps which are oriented at a greater angle to said rotor planar end faces than said oblique ramps so that the directional entry and exit of fluid at said low-pressure passageways retards the revolution of the said rotor in said first angular direction.

9. The improvement according to claim 8 wherein said reverse oblique ramps are shorter in the length than said oblique ramps.

10. An end cover for inclusion as a part of a pressure transfer device for transferring pressure energy from a high pressure first fluid to a lower pressure second fluid to provide a pressurized second fluid, which device includes:
a cylindrical housing,
a cylindrical rotor having a pair of opposite planar end faces with at least two channels extending axially therethrough between apertures located in said planar end faces, which rotor is mounted to revolve about its axis within said housing, and
end closures at opposite ends of said housing in said device,
one said end cover, which has axially inward and outward end surfaces, being disposed at each axial end of said rotor with said inward end surface interfacing with and slidingly and sealingly engaging each said respective end face of said rotor,
each of said two end covers being formed with one or more inlet passageways and one or more discharge passageways which open into said axially inward surfaces, and said two end covers being aligned so that when one rotor channel is aligned with an inlet passageway opening in one said end cover, it is also aligned with a discharge passageway opening in said other end cover,
said inlet passageway and discharge passageway openings in the same end cover being constantly sealed from each other during operation by a sealing region at the interface between said rotor end face and said end cover inward surface,
whereby, as a result of revolution of said rotor, each said rotor channel is, in alternating sequence, brought into partial or full alignment with a high pressure inlet passageway opening in one said end cover and a high pressure discharge passageway opening in the other said end cover and then into partial or full alignment with a lower pressure discharge passageway opening in said one end cover and a lower pressure inlet passageway opening in said other end cover, so that each said channel is alternately supplied with the high pressure first fluid through said one end cover and then with the lower pressure second fluid through said other end cover, and
said end covers having (a) oblique ramps formed in said high pressure inlet passageways or in said high pressure discharge passageways, which ramps cause directional flow of high pressure fluid into and out of said rotor channels such as to provide force that causes said rotor to revolve in a first angular direction, and (b) lower pressure inlet or discharge passageways that are devoid of any such ramps so that lower pressure fluid flow enters said rotor channels and exits therefrom in an essentially axial direction.

11. The end cover according to claim 10 wherein said oblique ramps are oriented at an angle of between 12° and 65° to said rotor planar end faces.

12. The end cover according to claim 10, wherein said oblique ramps are oriented at an angle of between about 18° and about 24° to said rotor planar end faces.

13. The end cover according to claim 12, wherein there are formed two passageways with said oblique ramps and two passageways devoid of any such ramps.

14. In a pressure transfer device for transferring pressure energy from a high pressure first fluid to a lower pressure second fluid to provide a pressurized second fluid, which device includes:
- a cylindrical rotor mounted to revolve about its axis and having a pair of opposite planar end faces with at least two channels extending axially therethrough between apertures located in said planar end faces; and
- a pair of opposite end covers having axially inward and outward end surfaces, with said inward end surfaces interfacing with and slidingly and sealingly engaging said respective opposite end faces of said rotor,
- each said end cover having one or more inlet passageways and one or more discharge passageways which open into said axially inward surfaces, said opposite end covers being angularly aligned so that when one said channel in said rotor is aligned with an inlet passageway opening in one said end cover, it is also aligned with a discharge passageway opening in said other end cover,
- each said inlet passageway opening and each said discharge passageway opening in said same end cover being constantly sealed from each other during operation by a sealing region at the interface between said rotor end face and said end cover inward surface,
- whereby, as a result of revolution of said rotor, each said rotor channel is, in alternating sequence, brought into partial or full alignment with a high pressure inlet passageway opening in one said end cover and a high pressure discharge passageway opening in the said other end cover and then into partial or full alignment with a low pressure discharge passageway opening in said one end cover and a low pressure inlet passageway opening in said end cover, so that each said channel is alternately supplied with the high pressure first fluid through said one end cover and then with the lower pressure second fluid through said other end cover,
- the improvement which comprises oblique ramps in said high pressure inlet and discharge passageways in said end covers which cause directional flow of high pressure fluid into and out of said rotor channels to provide force that causes said rotor to revolve in a first angular direction, and reverse oblique ramps in said low-pressure inlet and discharge passageways which cause directional flow of low-pressure fluid into and out of said rotor channels in a manner which tends to retard the revolution of the rotor in the first angular direction.

15. The improvement according to claim 14 wherein said reverse oblique ramps are oriented at an angle to said rotor planar end faces greater than the angle of orientation of said oblique ramps.

16. The improvement according to claim 15 wherein said reverse oblique ramps are shorter in the length than said oblique ramps.

17. The improvement according to claim 15, wherein said oblique ramps are oriented at an angle of between 12° and 65° to said rotor planar end faces.

18. The improvement according to claim 15, wherein said oblique ramps are oriented at an angle of between 12° and 30° to said rotor planar end faces.

19. The improvement according to claim 15, wherein said oblique ramps are oriented at an angle of between about 18° and about 24° to said rotor planar end faces.

20. The improvement according to claim 19 wherein said reverse oblique ramps are oriented at an angle between about 45° and about 80°.

* * * * *